(12) United States Patent
Kawano et al.

(10) Patent No.: US 8,204,344 B2
(45) Date of Patent: Jun. 19, 2012

(54) OPTICAL MODULATOR

(75) Inventors: Kenji Kawano, Atsugi (JP); Seiji Uchida, Atsugi (JP); Eiji Kawazura, Ebina (JP); Yuji Sato, Atsugi (JP); Masaya Nanami, Zama (JP); Toru Nakahira, Atsugi (JP); Nobuhiro Igarashi, Sagamihara (JP); Satoshi Matsumoto, Tokyo (JP)

(73) Assignee: Anritsu Corporation, Atsugi-shi (JP)

( * ) Notice: Subject to any disclaimer, the term of this patent is extended or adjusted under 35 U.S.C. 154(b) by 94 days.

(21) Appl. No.: 12/471,838

(22) Filed: May 26, 2009

(65) Prior Publication Data

US 2009/0297087 A1 Dec. 3, 2009

Related U.S. Application Data

(60) Provisional application No. 61/056,296, filed on May 27, 2008.

(51) Int. Cl.
*G02F 1/035* (2006.01)
(52) U.S. Cl. ......................................................... 385/2
(58) Field of Classification Search .................. 385/1–3
See application file for complete search history.

(56) References Cited

U.S. PATENT DOCUMENTS 6,584,240 B2 * 6/2003 Doi et al. ............................ 385/2
7,224,869 B2 * 5/2007 Cole et al. ......................... 385/40

FOREIGN PATENT DOCUMENTS

| JP | A 64-91111 | 4/1989 |
|---|---|---|
| JP | A 2-51123 | 2/1990 |
| JP | A 4-288518 | 10/1992 |
| JP | A 2001-350050 | 12/2001 |

OTHER PUBLICATIONS

"Highly efficient 40-GHz bandwidth Ti:LiNbO3 optical modulator employing ridge structure" by Noguchi et al, IEEE Photonics Technology Letters, vol. 5, No. 1, pp. 52-54, Jan. 1993.*
"Lithium niobate ridge waveguides fabricated by wet etching," by Hu et al, IEEE Photonics Technology Letters, vol. 9, No. 6, pp. 417-419, Mar. 2007.*

* cited by examiner

Primary Examiner — Ryan Lepisto
Assistant Examiner — Robert Tavlykaev
(74) Attorney, Agent, or Firm — Greer, Burns, Crain, Ltd.

(57) ABSTRACT

Herein disclosed is an optical modulator, having: a substrate (1); and a center and ground electrodes (4a to 4c), in which the substrate has ridge portions (8a to 8c), the center and ground electrodes are respectively formed above the ridge portions, the ridge portions below the center and ground electrodes respectively have top parts (10a, 10b) having a respective first and second end points (18, 19) separated with a distance of "$W_R$", the substrate has a bottom surface (21b) between the ridge portions having center and midway points (23, 24) positioned with a respective distance of $W_R/2$ and $W_R/N$ ($3 \leq N \leq 25$) from the first end point, the ridge portion below the center electrode has a normal line (13), and the center point and the midway point define a straight line (25) crossed with the normal line at an angle larger or equal to 90.1°.

21 Claims, 13 Drawing Sheets

PRIOR ART

PRIOR ART

PRIOR ART

US 8,204,344 B2

OPTICAL MODULATOR

RELATED APPLICATIONS

This application claims the benefit under 35 U.S.C. §119 (e) of Provisional Patent Application Ser. No. 61/056,296 filed on May 27, 2008, the contents of which are incorporated by reference.

FIELD OF THE INVENTION

The present invention relates to an optical modulator for modulating, with high frequency electric signal, an incident light in an optical waveguide to be outputted as an optical pulse signal.

DESCRIPTION OF THE RELATED ART

In recent years, there has been practically used an optical communication system with high speed and high capacity. Many requests have been made to develop an optical modulator with high volume, small size and low cost for the purpose of enabling the optical modulator to be embedded in the optical communication system with high speed and high capacity.

In response to these requests, there have so far been developed various types of optical modulators one of which is a traveling wave electrode type of lithium niobate optical modulator comprising a substrate made of a material such as lithium niobate ($LiNbO_3$) having an electro-optic effect (hereinafter simply referred to as an LN substrate), an optical waveguide formed in the LN substrate and a traveling wave electrode formed on the substrate. The lithium niobate optical modulator of this type will be simply referred to as an LN optical modulator hereinafter. The electro-optic effect is adapted to vary a refractive index of the LN substrate in response to an electric field applied to the LN substrate. This type of LN optical modulator has been applied to a large volume optical communication system having a capacity of 2.5 Gbit/s or 10 Gbit/s due to the excellent chirping characteristics. In recent years, the LN optical modulator thus constructed is under review to be applied to the optical communication system having a super large capacity of 40 Gbit/s.

Characteristics of the conventional LN optical modulators using the electro-optic effect of lithium niobate realized or proposed will be described in turn hereinafter.

(First Prior Art)

FIG. 10 is a perspective view showing an LN optical modulator constituted by a z-cut state LN substrate according to the first prior art disclosed in patent document 1. FIG. 11 is a cross-sectional view taken along the line A-A' of FIG. 10.

The z-cut LN substrate 1 has an optical waveguide 3 formed therein. The optical waveguide 3 is formed with a process of thermally diffusing a metal Ti (titanium) at a temperature of 1050° C. for approximately 10 hours, and the optical waveguide 3 forms a Mach-Zehnder interferometer (or a Mach-Zehnder optical waveguide). This results in the fact that the optical waveguide 3 is constituted by two interaction optical waveguides 3a and 3b at a portion (or an interaction portion) where the incident light is interacted with an electric signal. In other words, two arms of the Mach-Zehnder optical waveguide are formed at the interaction portion.

The optical modulator further comprises an $SiO_2$ buffer layer 2 formed on the optical waveguide 3, and a traveling wave electrode 4 formed above the $SiO_2$ buffer layer 2. The traveling wave electrode 4 is constituted by a coplanar waveguide (CPW) having a center electrode 4a and two ground electrodes 4b and 4c. The traveling wave electrode 4 is generally made by metal Au. The optical modulator has an Si conducting layer 5 formed on the $SiO_2$ buffer layer 2 for suppressing temperature drift caused by a pyroelectric effect. The pyroelectric effect is peculiar in the case that the z-cut LN substrate 1 is used to form the LN optical modulator. The Si conducting layer 5, which is shown in FIG. 10, is omitted in FIG. 11 to avoid the tedious explanation.

The optical modulator further comprises a feeder wire 6 for the high frequency (RF) electric signal. The high frequency (RF) electric signal for modulation is supplied to the center electrode 4a and the ground electrodes 4b, 4c through the feeder wire 6 for the high frequency (RF) electric signal, which results in an electric field applied between the center electrode 4a and the ground electrodes 4b, 4c. This electric field induces an effective refractive index $n_0$ of each of the interaction optical waveguides 3a and 3b to be varied, due to the electro-optic effect of the z-cut LN substrate 1. This results in the fact that incident lights respectively traveling through the interaction optical waveguides 3a and 3b have phases different from each other. The optical output is switched to "OFF" state when the phase difference becomes "π", resulting from the fact that higher-order mode is excited at a merge portion of the Mach-Zehnder optical waveguide 3, where the interaction optical waveguides 3a and 3b are merged. The optical modulator further comprises an output wire 7 for the high frequency (RF) electric signal. The output wire 7 for the high frequency electric signal may be replaced by a termination resistance.

As can be seen from FIG. 11, the optical modulator disclosed in the patent document 1 has following characteristics.

1) The center electrode 4a has a width "S" in the range of approximately 6 to 12 μm, which is substantially equal to the widths of the interaction optical waveguides 3a and 3b.

2) The center electrode 4a and each of the ground electrodes 4b and 4c form a gap (or a gap of the CPW) "W" such that the gap has a wide width in the range of approximately 15 to 30 μm.

3) Microwave equivalent refractive index $n_m$ of the high frequency electric signal is reduced to be closer to the effective refractive index $n_0$ of each of the interaction optical waveguides 3a and 3b, while shifting a characteristic impedance of the high frequency electric signal to be closer to 50Ω, by setting a thickness "D" of the $SiO_2$ buffer layer 2 as thick as approximately 400 nm to 1.5 μm by utilizing the fact that the $SiO_2$ buffer layer 2 has a relative permittivity which is relatively as low as 4 to 6. The $SiO_2$ buffer layer 2 has previously been utilized only for suppressing absorption of the incident lights traveling through the interaction optical waveguides 3a and 3b caused by the metal of the center electrode 4a and ground electrodes 4b and 4c. In the patent document 2, the optical modulator has a similar constitution with the optical modulator disclosed in the patent document 1 shown in FIG. 11, while having a thickness "T" thicker than that of the patent document 1, to ensure that the microwave equivalent refractive index $n_m$ is further reduced to be closer to the effective refractive index $n_0$ of each of the interaction optical waveguides 3a and 3b.

The LN optical modulator with the above mentioned construction has improved characteristics, such as for example, optical modulation bandwidth and characteristic impedance in comparison with the characteristics of the conventional optical modulator with the center electrode 4a having a width "S" of approximately 30 μm, gaps "W" between the center electrode 4a and the ground electrodes 4b and 4c, of approximately 6 μm, and the $SiO_2$ buffer layer 2 having a thickness "D" of 300 nm. However, more improved characteristics in optical modulation bandwidth, driving voltage, and characteristic impedance have been requested for the optical modulator. In response to this request, there has been proposed an optical modulator having a construction of so-called "ridge structure". The optical modulator with the ridge structure will be described hereinafter as a second prior art.

(Second Prior Art)

FIG. 12 shows the so-called ridge structure as the second prior art disclosed in the patent document 3, which has been proposed to further enhance the performance of the optical modulator compared to that of the first prior art. The optical modulator comprises a ridge portion 8a below the center electrode 4a, a ridge portion 8b below the ground electrode 4b, and a ridge portion 8c below the ground electrode 4c. The z-cut LN substrate 1 has a bottom surface 9a between the ridge portions 8a and 8c, a bottom surface 9b between the ridge portions 8a and 8b. The ridge portions 8a to 8c have top parts 10a to 10c, respectively. The ridge portions 8a and 8b collectively form a gap portion 11b, while the ridge portions 8a and 8c collectively form a gap portion 11a.

The legend "H" represents a height of the ridge portions 8a to 8c. The legend "T" represents a thickness of the traveling wave electrode 4. The legend "D" represents a thickness of the $SiO_2$ buffer layer 2 above the bottom surface 9a between the ridge portions 8a and 8c, and above the top part 10a of the ridge portion 8a. Electric lines of force 12 extending from the center electrode 4a to the ground electrodes 4b and 4c are also shown in FIG. 12. The electric lines of force 12 affect the interaction optical waveguides 3a and 3b in that the refractive index of each of the interaction optical waveguides 3a and 3b is varied. In other words, the electric lines of force 12 interact with the incident lights traveling through the respective interaction optical waveguides 3a and 3b.

The optical modulator according to the second prior art is advantageous in that the microwave equivalent refractive index $n_m$ can be reduced more to be closer to the effective refractive index $n_0$ of each of the interaction optical waveguides 3a and 3b, and in that the characteristic impedance of the high frequency electric signal can be higher to be closer to 50Ω. This results from the fact that the ridge portions 8a and 8b are formed on the z-cut LN substrate 1, and that the electric lines of force 12 can pass through the gap portion 11b formed between the ridge portions 8a and 8b, and the gap portion 11a formed between the ridge portions 8a and 8c. In addition, the electric lines of force 12 have a characteristic to be confined in a region having a high relative permittivity. Therefore, the electric lines of force 12 can have high interaction efficiency with the incident lights passing through the interaction optical waveguides 3a and 3b, which results in the reduction in driving voltage. Generally, the ridge portions 8a, 8b and 8c each have a height "H" in the range of approximately 2 to 5 μm. The traveling wave electrode 4 has a thickness "T" in the range of approximately 6 to 20 μm, which depends on the structure of the optical modulator, and the $SiO_2$ buffer layer 2 has a thickness in the range of approximately 400 nm to 1.5 μm.

The optical modulator according to the second prior art has a fundamental performance of the optical modulator highly improved compared to the optical modulator according to the first prior art shown in FIG. 11, where the fundamental performance is exemplified by an optical modulation bandwidth, driving voltage, and a characteristic impedance.

The optical modulator according to the second prior art, however, still encounters a problem to be solved. The problem of the second prior art will be described hereinafter. FIG. 13 is an enlarged view of the gap portion formed between the center electrode 4a and the ground electrode 4b shown in FIG. 12. As shown in FIG. 13, the ridge portion 8a below the center electrode 4a has an end point 18 at the top part 10a, while the ridge portion 8b below the ground electrode 4b has an end point 19 at the top part 10b, the end point 18 and the end point 19 are separated with each other with the distance of "$W_R$". The top part 10a of the ridge portion 8a below the center electrode 4a has a normal line 13.

The bottom surface 9b has a point 14 (this point will be referred to as a center point 14 hereinafter) apart from the end point 18 of the top part 10a with a distance of $W_R/2$ in a horizontal direction. The bottom surface 9b further has a point 15 (this point will be referred to as a midway point 15 hereinafter) apart from the end point 18 of the top part 10a with a distance of $W_R/N$ in a horizontal direction. The center point 14 and the midway point 15 define a straight line 16 passing therethrough. The normal line 13 and the straight line 16 are crossed at an angle θ of 90° due to the fact that the bottom surface 9b (and the bottom surface 9a) is parallel with the top part 10a of the ridge portion 8a and parallel with the top part 10b of the ridge portion 8b according to the second prior art. The angle θ becomes 90° regardless of the numerical number "N" which is ranged from 3 to 25 in the second prior art. Here, the number of electric lines of force passing through the z-cut LN substrate 1 in reality is more than the number of those shown in FIG. 13, due to the fact that the electric lines of force 12 in FIG. 13 are shown schematically.

Therefore, only some of the electric lines of force 12 extending between the center electrode 4a and the ground electrode 4b are shown in FIG. 13. As shown in this drawing, some of the electric lines of force having a downward convex shape pass through the z-cut LN substrate 1, which are shown as electric lines of force 17 in FIG. 13.

The z-cut LN substrate 1 is anisotropic in that it has a relative permittivity in a direction perpendicular to the surface of the z-cut LN substrate 1 which is different from a relative permittivity in a direction parallel to a longitudinal direction of the optical waveguide 3. The z-cut LN substrate 1 has a relative permittivity of approximately as high as "34" on average. This results in the fact that the advantageous effect of the ridge structure to reduce the microwave equivalent refractive index $n_m$ to be closer to the effective refractive index $n_0$ of each of the interaction optical waveguides 3a and 3b, and to raise the characteristic impedance of the high frequency electric signal to be closed to 50Ω, can not be maximally realized due to the existence of the electric lines of force 17 shown in FIG. 13.

It is required for the optical modulator of the second prior art to form the height "H" of the ridge portions higher in order to reduce the number of electric lines of force 17 passing through the z-cut LN substrate 1 shown in FIG. 13. This results in increasing the number of processes to form the ridge portions, thereby resulting in high cost of LN optical modulator and low process yield.

Patent Document 1

Japanese Patent Laying-Open Publication No. H02-51123

Patent Document 2

Japanese Patent Laying-Open Publication No. H01-91111

Patent Document 3

Japanese Patent Laying-Open Publication No. H04-288518

As described above, the LN optical modulator according to the second prior art can improve the optical modulation characteristics such as the optical modulation bandwidth, the driving voltage, and the characteristic impedance, compared to the optical modulator according to the first prior art. However, the optical modulation characteristics are deteriorated in some degree, which results in the increase in the microwave equivalent refractive index $n_m$ and the reduction in the characteristics impedance, due to the fact that the electric lines of force 17 between the center electrode and the ground electrodes generated by the high frequency electric signal are passed through the z-cut LN substrate 1 beyond necessity resulting from the fact that the bottom surface between the ridge portions is parallel with the top part of the ridge portion. Meanwhile, it is required to make the height "H" of the ridge portions higher in order to reduce the number of electric lines of force passing through the z-cut LN substrate 1. This results in increasing the number of processes to form the ridge portions, thereby resulting in high cost of LN optical modulator. More specifically, the height of the ridge portion should not be too high or too low, and there is an optimum height from the standpoint of the optical modulation efficiency. However, it is difficult to form the ridge portion to have the optimum height by the process of dry etching with a gas in the form of plasma, due to the fact that the z-cut LN substrate is extremely hard. Therefore, the advantages of the optical modulator with ridge structure have not been maximally developed. Moreover, the depth where the z-cut LN substrate is etched tends to vary or the z-cut LN substrate may be cracked during the etching process, as the time length to form the ridge portion becomes longer. This results in deteriorating the process yield of the LN optical modulator. Here, the fact that the electric lines of force having a curvature of downward convex tend to pass through the plane bottom surface between the ridge portions is equivalent to the fact that the modulation characteristics of the LN optical modulator are not fully brought out.

SUMMARY OF THE INVENTION

It is, therefore, an object of the present invention to provide an LN optical modulator to solve the problems in accordance with the examples of the prior art, which can have a wide optical modulation bandwidth, proper characteristic impedance, and low driving voltage, while reducing the cost and improving the process yield.

According to a first aspect of the present invention, there is provided an LN optical modulator, comprising: a substrate having an electro-optic effect; a buffer layer formed over the substrate; and a traveling wave electrode including a center electrode and a ground electrode formed above at least a part of the buffer layer, in which the substrate has a plurality of ridge portions including a first ridge portion and a second ridge portion, the ridge portions being formed with a process of forming gap portions by digging the substrate at regions where electric field generated by a high frequency electric signal traveling through the traveling wave electrode is strong, at least one of the ridge portions has an optical waveguide formed therein, and the center electrode and the ground electrode are respectively formed above the first ridge portion and the second ridge portion, characterized in that the first ridge portion below the center electrode has a top part having a first end point, the second ridge portion below the ground electrode has a top part having a second end point, the first end point and the second end point are separated with each other with a distance of "$W_R$", the substrate has a bottom surface formed between the ridge portions, and the substrate has a cross section vertical to the longitudinal direction of the optical modulator and crossing the ridge portions, the cross section being formed such that, the bottom surface has a center point and a midway point, the center point being positioned with a distance of $W_R/2$ in a horizontal direction from the first end point, the midway point being positioned with a distance of $W_R/N$ ($3 \leq N \leq 25$) in a horizontal direction from the first end point, the first ridge portion below the center electrode has a normal line to the top part, the center point and the midway point define a straight line passing therethrough, and the straight line is crossed with the normal line at an angle larger or equal to 90.1°, to ensure that a microwave equivalent refractive index $n_m$ of the high frequency electric signal is reduced to be close to an effective refractive index $n_0$ of the optical waveguide.

According to a second aspect of the present invention, there is provided an LN optical modulator, in which the bottom surface has a curvature of convex to the inside of the substrate.

According to a third aspect of the present invention, there is provided an LN optical modulator, in which the bottom surface is partly formed to be flat plane.

According to a fourth aspect of the present invention, there is provided an LN optical modulator, in which the midway point is positioned with a distance of $W_R/8$ in a horizontal direction from the first end point.

According to a fifth aspect of the present invention, there is provided an LN optical modulator, in which the straight line is crossed with the normal line at an angle larger or equal to 90.5°.

According to a sixth aspect of the present invention, there is provided an LN optical modulator, in which the straight line is crossed with the normal line at an angle larger or equal to 92°.

According to a seventh aspect of the present invention, there is provided an LN optical modulator, in which the straight line is crossed with the normal line at an angle larger or equal to 94°.

According to an eighth aspect of the present invention, there is provided an LN optical modulator, in which the bottom surface and one of the ridge portions are connected by an intersection portion having a curvature.

According to a ninth aspect of the present invention, there is provided an LN optical modulator, in which the curvature of the intersection portion is formed by an arc having a curvature radius of "R", the curvature radius "R" being shorter or equal to 0.5 μm.

According to a tenth aspect of the present invention, there is provided an LN optical modulator, in which the curvature of the intersection portion is formed by an arc having a curvature radius of "R", the curvature radius "R" being longer or equal to 0.5 μm.

According to an eleventh aspect of the present invention, there is provided an LN optical modulator, comprising: a substrate having an electro-optic effect; a buffer layer formed over the substrate; and a traveling wave electrode including a center electrode and a ground electrode formed above at least a part of the buffer layer, in which the substrate has a plurality of ridge portions including a first ridge portion and a second ridge portion, the ridge portions being formed with a process of forming gap portions by digging the substrate at regions where electric field generated by a high frequency electric signal traveling through the traveling wave electrode is strong, at least one of the ridge portions has an optical waveguide formed therein, and the center electrode and the ground electrode are respectively formed above the first ridge portion and the second ridge portion, characterized in that the first ridge portion below the center electrode has a top part having a first end point, the second ridge portion below the ground electrode has a top part having a second end point, the first end point and the second end point are separated with each other with a distance of "$W_R$", the substrate has a bottom surface formed between the ridge portions, and the substrate has a cross section vertical to the longitudinal direction of the optical modulator and crossing the ridge portions, the cross section being formed such that, the bottom surface has a center point, a first midway point, and a second midway point, the center point being positioned with a distance of $W_R/2$ in a horizontal direction from the first end point, the second midway point being positioned with a distance of $W_R/N$ ($3 \leq N \leq 25$) in a horizontal direction from the first end point, the bottom surface further has a bump around the center point, the first midway point is positioned between the bump and the second midway point, the first ridge portion below the center electrode has a normal line to the top part, the first midway point and the second midway point define a straight line passing therethrough, and the straight line is crossed with the normal line at an angle larger or equal to 90.1°, to ensure that a microwave equivalent refractive index $n_m$ of the high frequency electric signal is reduced to be close to an effective refractive index $n_0$ of the optical waveguide.

According to an twelfth aspect of the present invention, there is provided an LN optical modulator, in which the second midway point is positioned with a distance of $W_R/8$ in a horizontal direction from the first end point.

The optical modulator according to this invention is constructed such that the bottom surface between the ridge portions is formed not to be parallel to the top part of the ridge portion, but to be inclined so that the bottom surface has a downward convex to the z-cut LN substrate. This results in the fact that the optical modulator is constructed so that most of the electric lines of force generated from the high frequency electric signal between the center electrode and the ground electrode can effectively feel the air having low relative permittivity. To be more precise, most of the electric lines of force pass through the air, while the electric lines of force are appropriately distributed in the z-cut LN substrate and in the air. This makes it possible to efficiently reduce the microwave equivalent refractive index of the high frequency electric signal so that the difference between the microwave equivalent refractive index and the effective refractive index of the optical waveguide can be small, while enabling the characteristic impedance of the high frequency electric signal to be closer to 50Ω. In addition, this constitution makes it possible to distinctly confine the electric lines of force generated from the high frequency electric signal in the ridge portion, which results in reducing the driving voltage. Therefore, this invention can widen the optical modulation bandwidth, reduce impedance mismatch with outer driving circuit, and lower the driving voltage. In addition, the fact that the bottom surface between the ridge portions is inclined (preferably to have the center portion of the bottom surface deepest) is equivalent to the fact that the bottom surface is deep (i.e. the ridge portion is high) for the electric lines of force having downward convex shape. The height of the ridge portion should not be too high or too low, and there is an optimum height from the standpoint of the optical modulation efficiency. By applying this invention, the electric lines of force can regard the bottom surface between the ridge portions as being deeply formed. Therefore, the LN optical modulator can have an optimum construction from the viewpoint of optical modulation efficiency even with low ridge portions, which results in improving the modulation characteristics. Moreover, the LN optical modulator can reduce the manufacturing cost and improve the process yield due to the fact that the height of the ridge portions can be lowered. Furthermore, from the viewpoint of the optical modulation characteristics, it is preferable that the bottom surface between the ridge portions is formed along the electric lines of force having a curvature of downward convex. That is to say, the LN optical modulator can maximally utilize the modulation characteristics while improving the manufacturing process yield by forming the bottom surface with optimum inclination in response to construction parameters such as thickness and width of the traveling wave electrode, thickness of the buffer layer, width and height of the ridge portions, and gap between the center electrode and the ground electrode.

DESCRIPTION OF THE PREFERRED EMBODIMENTS

Figure 1:
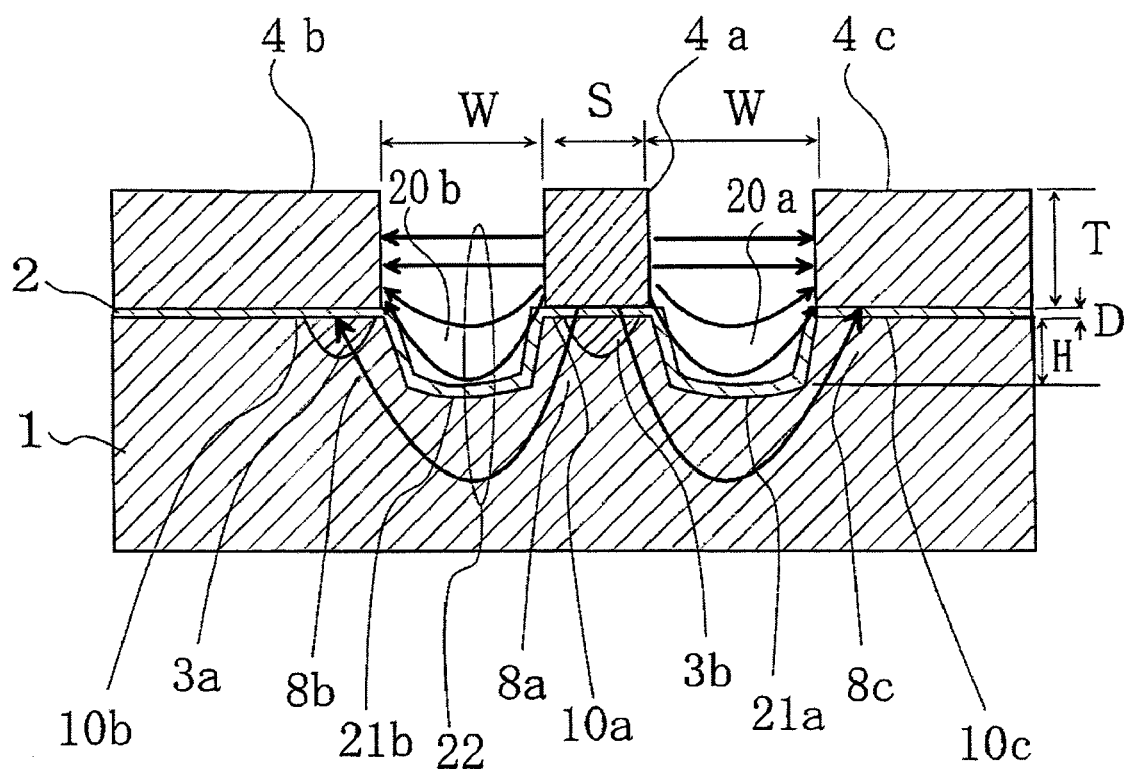
FIG. 1 is a sectional view schematically showing the optical modulator according to the first embodiment of the present invention.

The embodiments of this invention will now be described hereinafter. The constitutional elements having the reference numerals same with the prior art will be omitted due to the fact that the constitutional elements have the same function with those of the prior art.

First Embodiment

Figure 12:
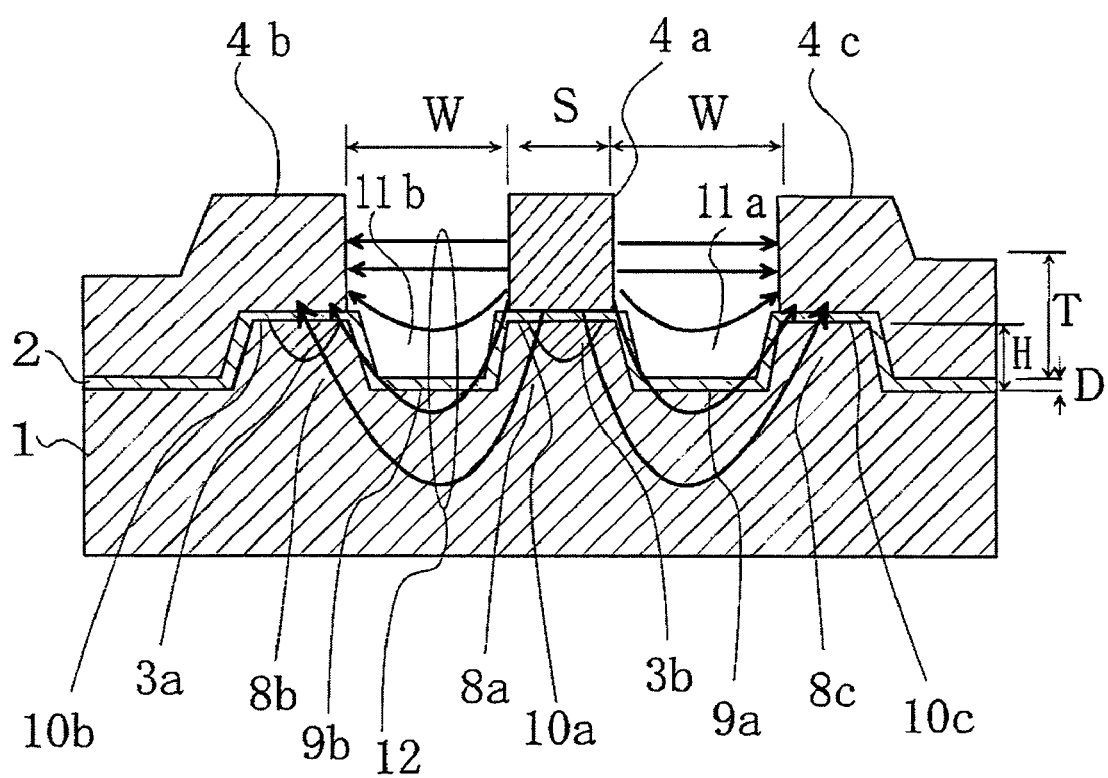
FIG. 12 is a sectional view schematically showing the optical modulator according to the second prior art.

FIG. 1 is a sectional view schematically showing the optical modulator according to the first embodiment of the present invention. In this embodiment, the z-cut LN substrate 1 is not etched with dry etching method at the portions below the ground electrodes 4b and 4c, which is different from the optical modulator according to the second prior art shown in FIG. 12. However, it goes without saying that the z-cut LN substrate 1 may be etched at the portions below the ground electrodes 4b and 4c.

According to this first embodiment, the width "S" of the center electrode 4a is set at 9 μm, the gap "W" between the center electrode 4a and each of the ground electrodes 4b and 4c is set at 30 µm, the thickness "T" of the center electrode 4a and ground electrodes 4b and 4c is set at 18 µm, the height "H" of the ridge portion is set at 3 µm, and the thickness "D" of the $SiO_2$ buffer layer 2 at the bottom surfaces 21a and 21b between the ridge portions and at the top parts 10a to 10c of the respective ridge portions 8a to 8c is set at 1.6 µm.

The legend "20b" represents the gap portion between the ridge portions 8a and 8b. The legend "20a" represents the gap portion between the ridge portion 8a and 8c. The legends "21a" and "21b" represent the bottom surface between the ridge portions. The bottom surfaces 21a and 21b each has a form of downward convex (curved surface in this case) according to the first embodiment of this invention shown in FIG. 1.

In FIG. 1, the legend "22" represents electric lines of force extending from the center electrode 4a to the ground electrodes 4b and 4c. The electric lines of force 22 interact with the interaction optical waveguides 3a and 3b to vary the effective refractive index of each of the interaction optical waveguides 3a and 3b.

Figure 2:
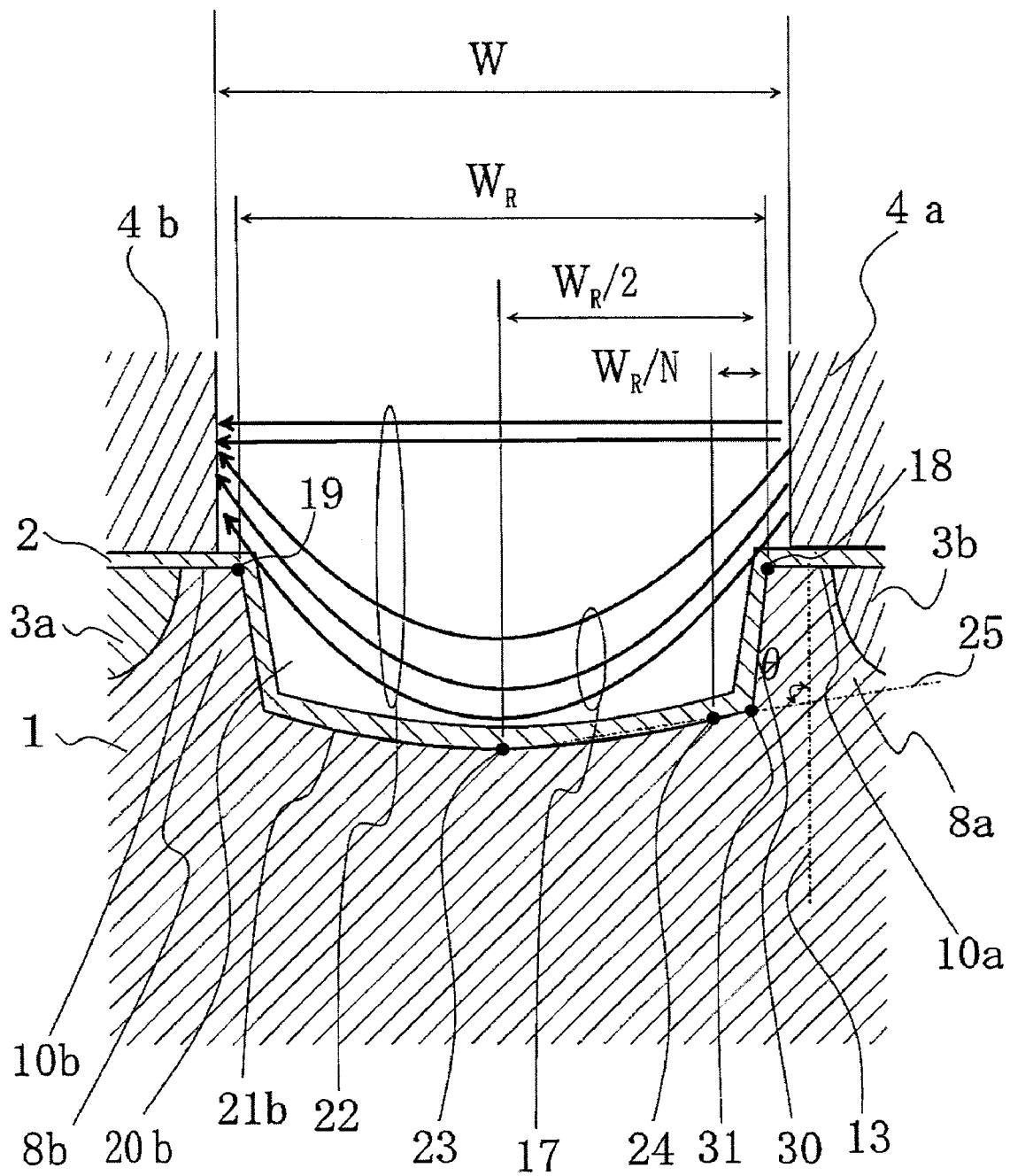
FIG. 2 is an enlarged view of the gap portion according to the first embodiment of the present invention.

FIG. 2 is an enlarged view of the gap portion between the center electrode 4a and ground electrode 4b shown in FIG. 1. In FIG. 2, the ridge portion 8a below the center electrode 4a has an end point 18 (first end point) at the top part 10a, while the ridge portion 8b below the ground electrode 4b has an end point 19 (second end point) at the top part 10b, the end point 18 and the end point 19 are separated with each other with the distance of "$W_R$", which is the same as the second prior art. The top part 10a of the ridge portion 8a below the center electrode 4a has a normal line 13.

The bottom surface 21b between the ridge portions 8a and 8b has a center point 23 positioned with the distance of $W_R/2$ in a horizontal direction from the end point 18 of the top part 10a of the ridge portion 8a below the center electrode 4a. The bottom surface 21b further has a midway point 24 with the distance of $W_R/N$ in a horizontal direction from the end point 18. The center point 23 and the midway point 24 define a line 25 passing therethrough. As shown in FIG. 2, the bottom surface 21b (and the bottom surface 21a) has a curvature of downward convex. This results in the fact that the line 25 passing through the center point 23 and the midway point 24 is crossed with the normal line 13 at an angle θ of 94°, which is larger than 90°. The number "N" is set in the range of 3 to 25, while it is preferable that the number "N" is set at the numerical number "8". The angle θ is not limited to 94°, and it is important for the angle θ to be larger or equal to 90.1°, such as 90.5°, 92° and 94°.

In other word, the center point 23 is positioned lower than the intersection 31, where the intersection 31 is determined by one line along the side surface 30 of the ridge portion 8a below the center electrode 4a and another line passing through the center point 23 and the midway point 24 of the bottom surface 21b. The fact that the line passing through the center point and the midway point 24 is crossed with the normal line at an angle θ larger than 90° can be applied not only where the normal line is determined by the ridge portion 8a below the center electrode 4a, but also where the normal line is determined by the ridge portions below the ground electrodes 4b and 4c. Moreover, it is within the scope of the invention that at least one of the normal lines along the ridge portions 8a to 8c is crossed with the line passing through the center point and the midway point at an angle θ larger than 90°. In addition, this fact can be applied to all embodiments of this invention. As described above, it is preferable that the line 25 passing through the center point 23 and the midway point 24 is crossed with the normal line 13 at an angle θ larger or equal to 90.1°, and it is more preferable that the angle θ is larger or equal to 90.5°, such as 92° or 94°.

Figure 4:
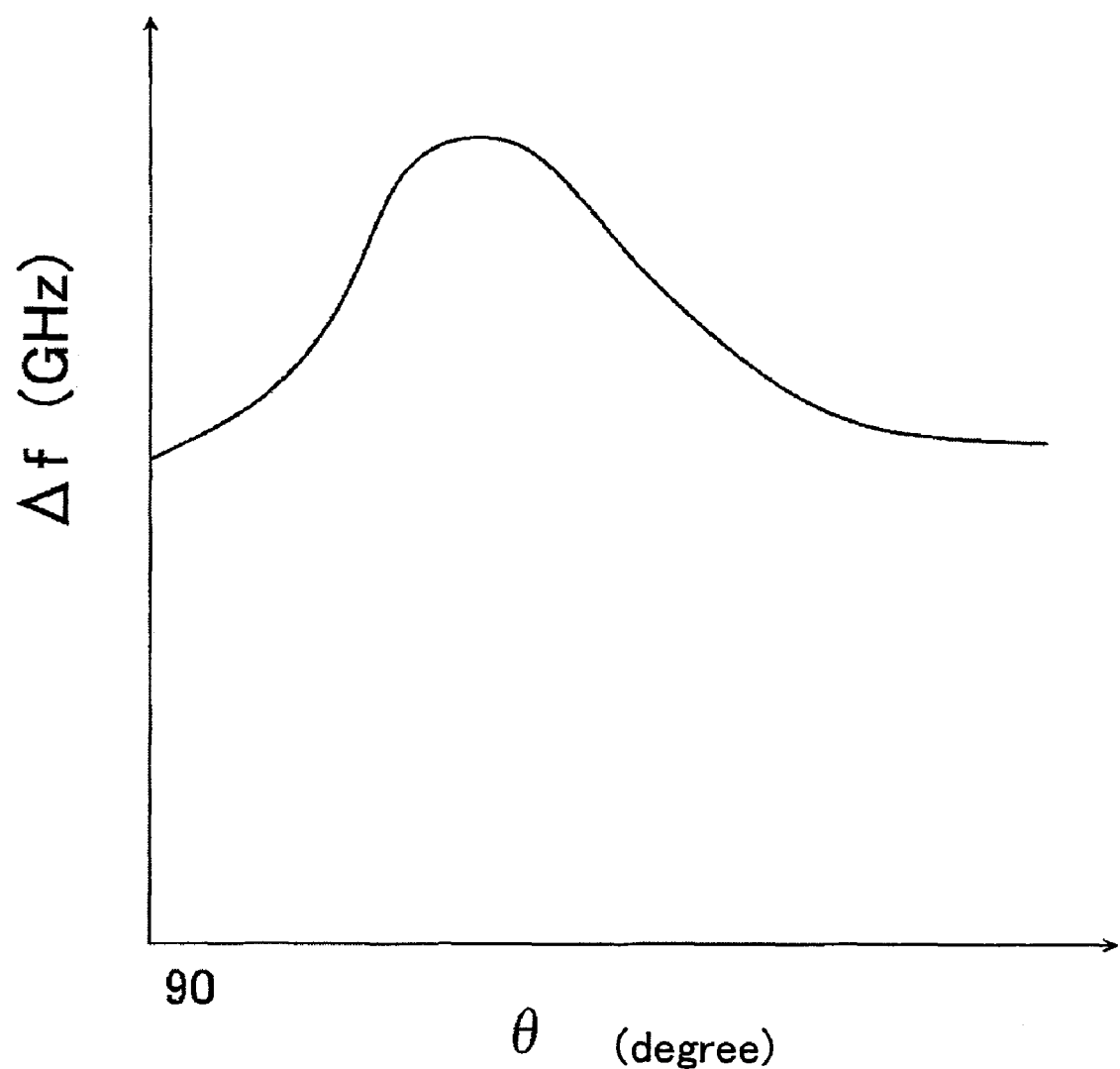
FIG. 4 is a graph to explain an operating principle of the optical modulator according to the first embodiment of the present invention.

Meanwhile, the prior art disclosed in FIG. 4 of Japanese Patent Laying-Open Publication No. 2001-350050 will be described, which looks like as if the bottom surface between the ridge portions is formed to be downward convex. In FIG. 4, an impression is given that the bottom surface seems to have downward convex. However, this impression is a mere illusion due to the fact that the scale of the longitudinal axis is extremely expanded compared to the scale of the horizontal axis, where the half length of the bottom surface between the ridge portions is about 750 µm, while the height of the inclined portion between the ridge portions is 0.4 µm at a maximum. Moreover, the bottom surface is inclined at an angle of 0.03°, which is extremely small. (This angle is equal to 90.03°, which is substantially equal to 90° when expressed by the angle θ shown in FIG. 2 of this application.) This results in the fact that the bottom surface between the ridge portions is formed as a flat plane according to the construction disclosed in the above mentioned patent document.

The construction disclosed in the above mentioned Japanese Patent Laying-Open Publication is aimed to prevent the substrate from being cracked when ridge portions are being formed, which is tantamount to forming a curvature around the intersection 31 defined by the side surface 30 of the ridge portion and the bottom surface 21a between the ridge portions in FIG. 2 according to this invention. On the other hand, the construction disclosed in this application is aimed to optimize the number of electric lines of force distributed in the air and in the z-cut LN substrate 1 in order to maximize (or improve) the optical modulation efficiency, by means of constructing the portion around the center point of the bottom surface between the ridge portions to be deepest. In other words, the bottom surface between the ridge portions is formed to have an inclination so that the bottom surface has a downward inclination, or has a downward convex. Therefore, the invention according to this application is completely different in purpose, means, construction, and effect from the above mentioned patent document.

Figure 13:
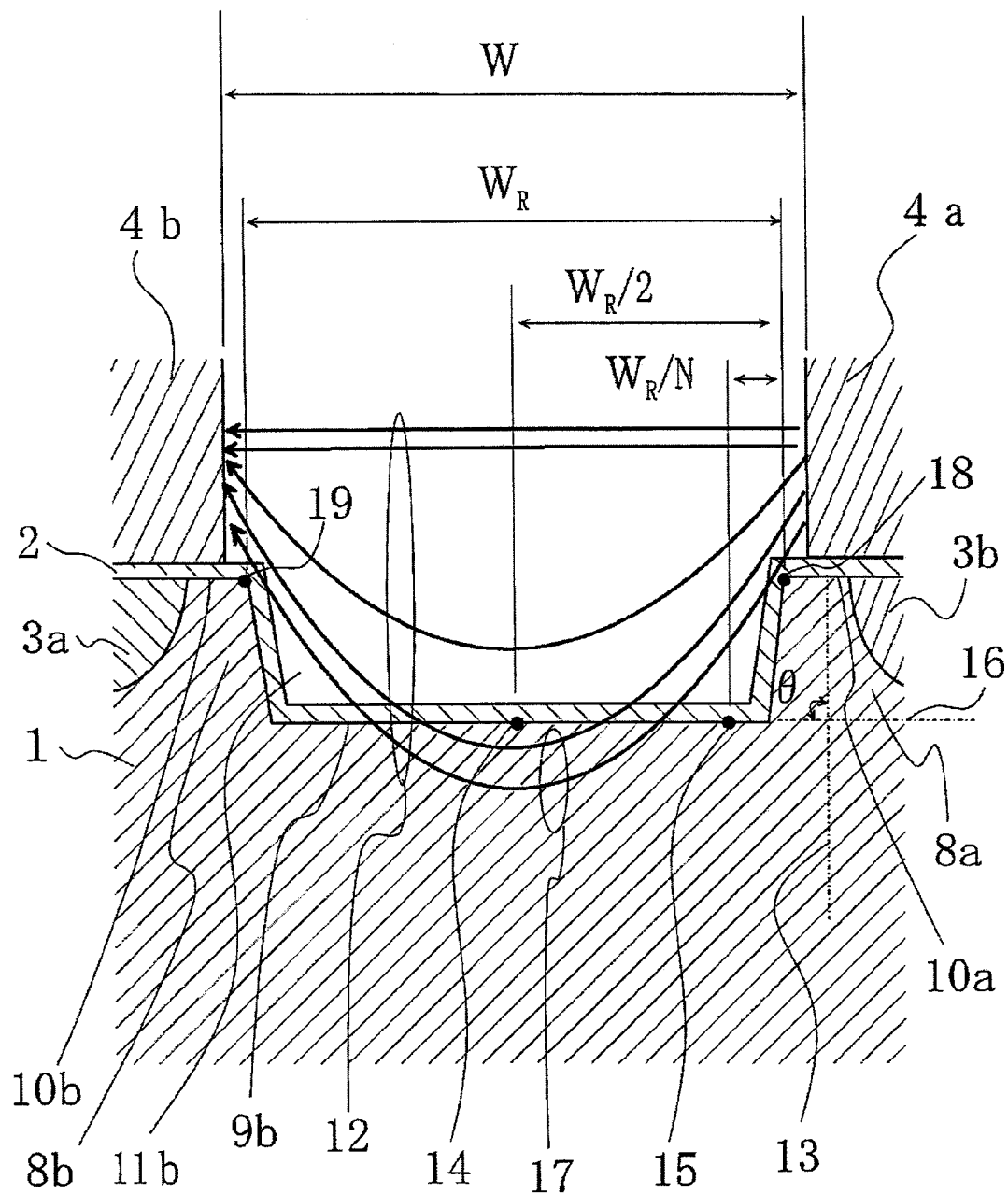
FIG. 13 is an enlarged view of the gap portion according to the third prior art.

That is to say, the electric lines of force 17 pass through the z-cut LN substrate 1 beyond necessity according to the second prior art as shown in FIG. 13. Meanwhile, some of the electric lines of force 17 can avoid passing through the z-cut LN substrate 1 as shown in FIG. 2 according to this embodiment. Therefore, the construction of this embodiment makes it possible, from the perspective of optical modulation characteristics, to optimally distribute the electric lines of force over the z-cut LN substrate 1 and the air.

Figure 3:
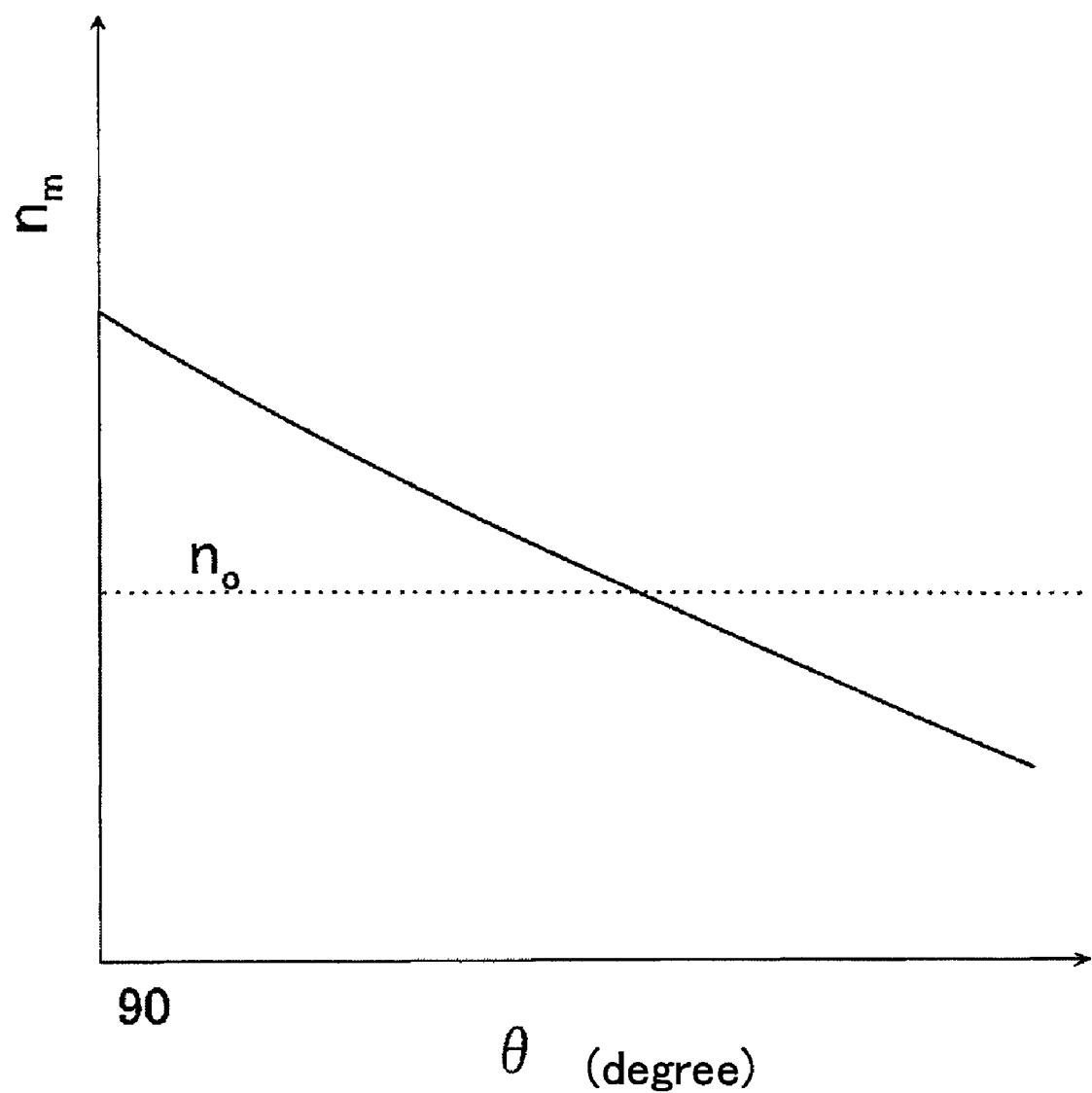
FIG. 3 is a graph to explain an operating principle of the optical modulator according to the first embodiment of the present invention.

FIG. 3 is a graph showing the microwave equivalent refractive index $n_m$ in response to the angle θ between the normal line 13 and the line 25 passing through the center point 23 and the midway point 24, in the case that the angle θ is larger than 90°. The effective refractive index $n_0$ of the interaction optical waveguides 3a and 3b is also shown in FIG. 3. As can be seen from this graph, the microwave equivalent refractive index $n_m$ becomes smaller as the angle θ becomes larger. The microwave equivalent refractive index $n_m$ becomes smaller than the effective refractive index $n_0$ of the interaction optical waveguides 3a and 3b when the angle θ becomes too large.

FIG. 4 is a graph showing the 3 dB bandwidth Δf in response to the angle θ. As shown in this graph, the angle θ has an optimum value. It goes without saying that the optimum value of the angle θ in this graph is equal to the value of the angle θ where the microwave equivalent refractive index $n_m$ becomes equal to the effective refractive index $n_0$ of the interaction optical waveguides 3a and 3b. The optimum value of the angle θ is dependent on the height of the ridge portions 8a, 8b and 8c, the thickness of the buffer layer 2, the thickness of the electrodes, the width "S" of the center electrode 4a, the gap "W", and so on.

It is within the scope of this invention that the optical modulator has above described construction as far as it can reduce the difference between the microwave equivalent refractive index $n_m$ and the effective refractive index $n_0$ of the interaction optical waveguides 3a and 3b instead of making the microwave equivalent refractive index $n_m$ to be totally equal to the effective refractive index $n_0$ of the interaction optical waveguides 3a and 3b.

Figure 5:
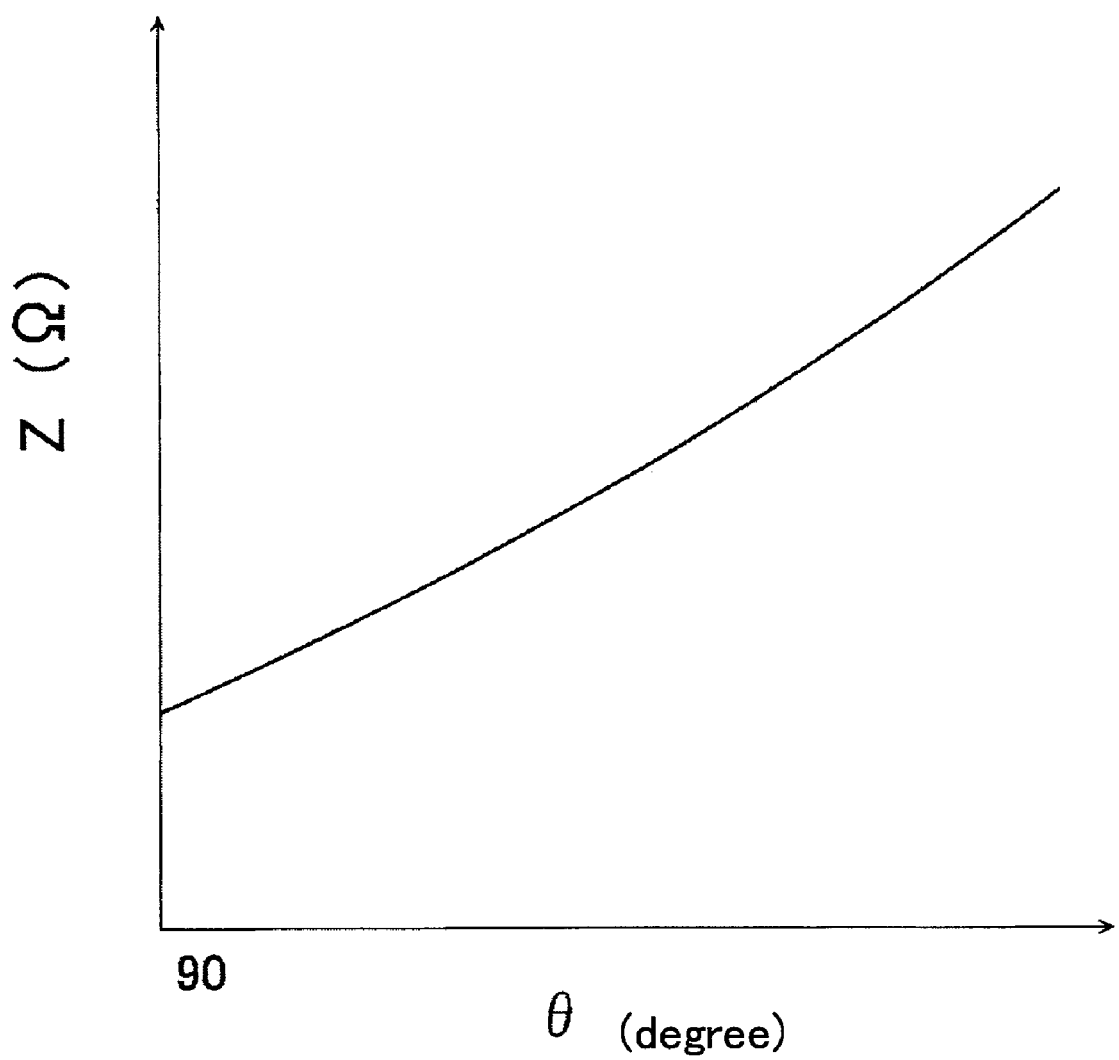
FIG. 5 is a graph to explain an operating principle of the optical modulator according to the first embodiment of the present invention.

FIG. 5 is a graph showing the characteristic impedance Z in response to the degree θ. The characteristic impedance Z becomes larger as the degree becomes larger.

This constitution, therefore, makes it possible to highly utilize the advantage of the ridge structure in that it can reduce the microwave equivalent refractive index $n_m$ to be closer to the effective refractive index $n_0$ of the interaction optical waveguides 3a and 3b, and to increase the characteristic impedance Z to be closer to 50Ω.

This results in the fact that it is not necessary to set the height "H" of the ridge portion higher than necessity, and the number of processes to form the ridge structure can be reduced. Therefore, it is possible to lower the cost of LN optical modulator while improving the process yield. Here, this effect can be obtained when the gap between the center electrode 4a and ground electrodes 4b and 4c each is narrower or equal to 100 μm, and the effect becomes larger as the gap becomes narrower, and becomes obvious when the gap is narrower or equal to 50 μm.

Figure 6:
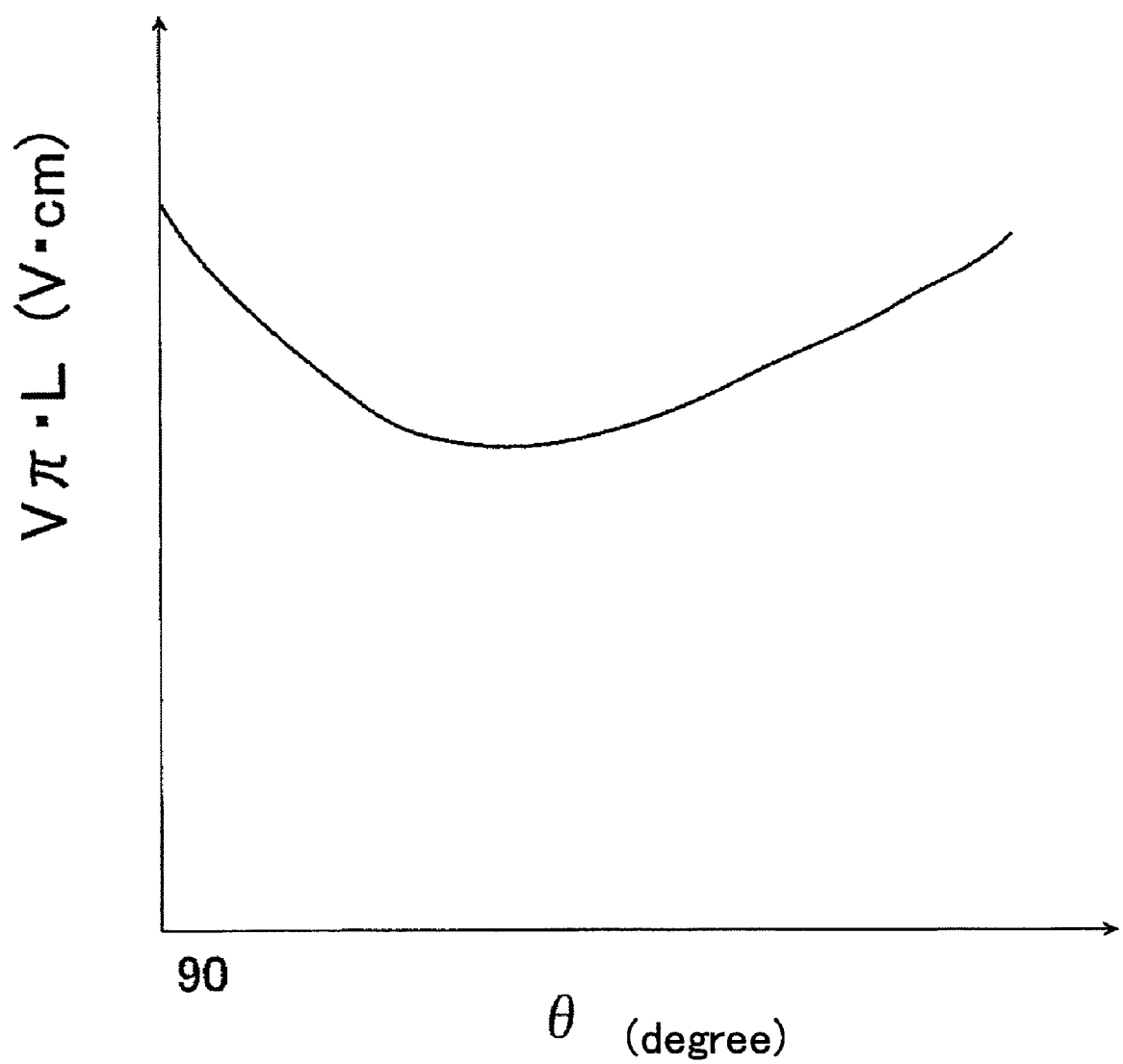
FIG. 6 is a graph to explain an operating principle of the optical modulator according to the first embodiment of the present invention.

FIG. 6 is a graph showing the product Vπ*L in response to the angle θ, where "Vπ" is half-wavelength voltage of the LN optical modulator and "L" is an interaction length between the high frequency electric signal traveling through the traveling wave electrode 4 and the lights traveling through the interaction optical waveguides 3a and 3b. As shown in this graph, the angle θ has an optimum value. In other words, the electric lines of force tend to confine within a material having high relative permittivity such as the z-cut LN substrate 1, while most electric lines of force leak from the ridge portions under the condition that the angle θ becomes too large. This results in the fact that there is an optimum angle θ to have the electric lines of force of the high frequency electric signal confined surely within the ridge portions, and that the driving voltage can be reduced when the angle θ is set at the optimum value or around the optimum value. This means that it is highly preferable to form the bottom surface between the ridge portions to have a curvature of downward convex along the electric lines of force having a curvature of downward convex, from the viewpoint of the optical modulation characteristics.

It is necessary for the constructions according to all embodiments of this invention to set the angle θ to be larger or equal to 90.1°, and it is preferable to be larger or equal to 90.5°. It goes without saying that the bottom surface between the ridge portions may be formed with the combination of curved surface and flat surface, or only with the flat surface as long as above described condition is satisfied.

Here, the definition of the word "ridge portion" according to this invention is wide enough to be applied to any constructions in which the z-cut LN substrate 1 is not dug at portions below one or both of the ground electrodes 4b and 4c. Any of these constructions can have an effect of this invention, according to not only the first embodiment but also all embodiments of this invention. It is also within the scope of this invention that the z-cut LN substrate 1 is not dug at the portion between the center electrode 4a and ground electrode 4c and dug only at the portion between the center electrode 4a and ground electrode 4b. Moreover, it is preferable to set the height "H" of the ridge portions in the range of 1 to 8 μm. These facts can be applied to all embodiments of this invention.

Second Embodiment

Figure 7:
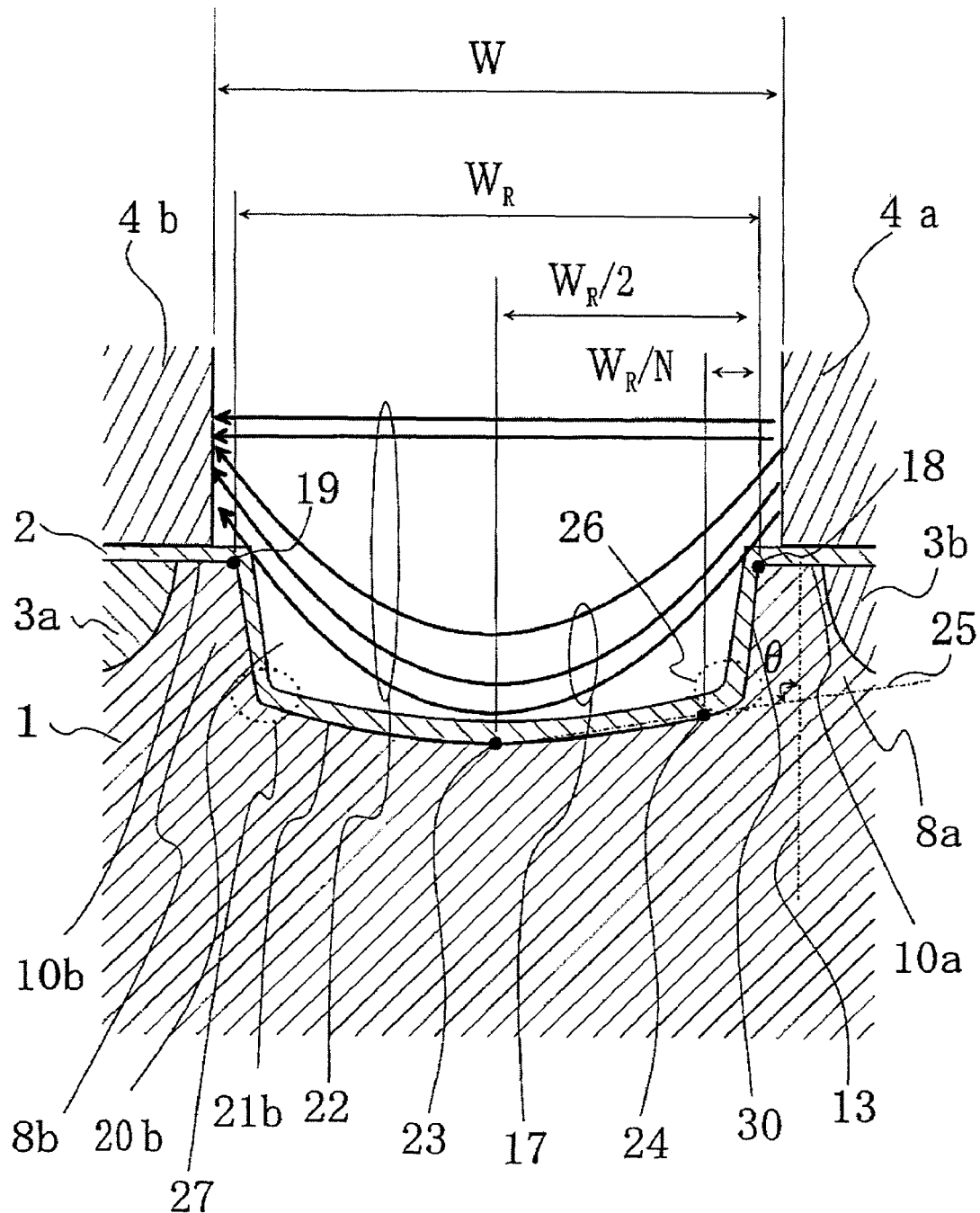
FIG. 7 is an enlarged view of the gap portion according to the second embodiment of the present invention.

Referring now to FIG. 7 of the accompanying drawings, an optical modulator according to the second embodiment of the present invention will be described hereinafter.

The constitutional elements of the second embodiment shown in FIG. 7 the same as those of the first embodiment of the optical modulator will not be described but bear the same reference numerals and legends as those of the first embodiment of the optical modulator.

FIG. 7 is an enlarged view showing the optical modulator according to the second embodiment of this invention. In this embodiment, the line 25 passing through the center point 23 and the midway point 24 is crossed at an angle θ larger than 90.1° with the normal line 13 to the top part 10a of the ridge portion 8a. In this second embodiment, portions 26 and 27, proximity to the intersections defined by the bottom surface 21b and the respective ridge portions 8a and 8b, have a curvature with the radius of "R". It is preferable that the radius "R" of the curvature is set to be shorter or equal to 0.5 μm from the aspect of reducing the driving voltage effectively by reducing the microwave equivalent refractive index $n_m$ and by heightening the characteristic impedance. However, it is important for this invention to incline the line passing through the center point 23 and the midway point 24 (i.e. to lower the center point 23 between the ridge portions), and therefore it is not crucial whether the portions 26, 27 proximity to the intersections defined by the ridge portions 8a, 8b and the bottom surface 21b have a curvature with the radius of "R" or not. Accordingly, the curvature radius "R" may be longer or equal to 0.5 μm. Though there has been described about the fact that the portions 26, 27 are formed by a curvature, such as an arc. However, it goes without saying that the portions 26, 27 are not necessary to have a precise curvature. In addition, this construction can be applied to any portions proximity to the intersections of the ridge portions and the bottom surface according to any embodiments of this invention, such as the intersections of the ridge portions 8a, 8c and the bottom surface 21a in FIG. 1.

Third Embodiment

Figure 8:
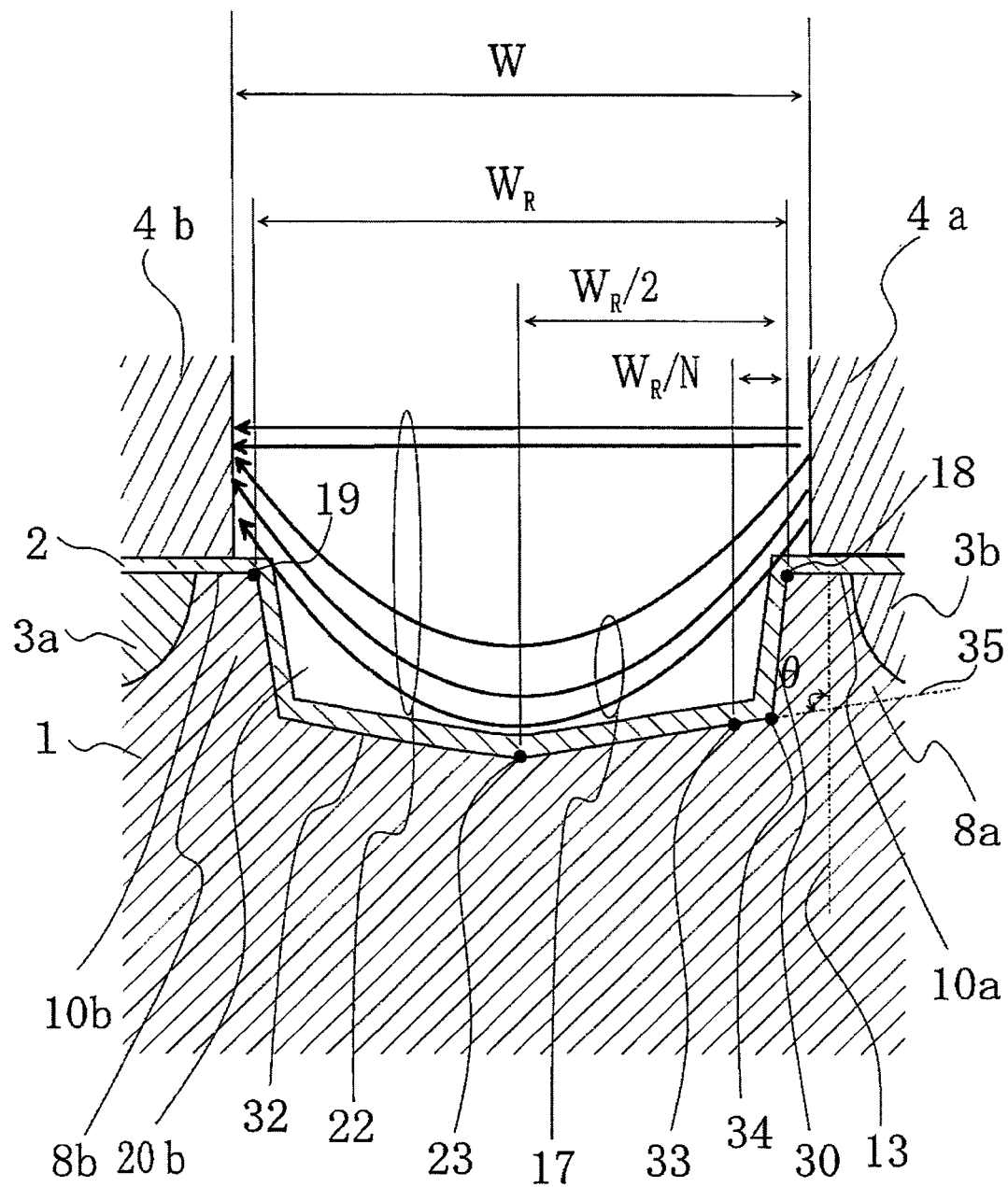
FIG. 8 is an enlarged view of the gap portion according to the third embodiment of the present invention.

Referring now to FIG. 8 of the accompanying drawings, an optical modulator according to the third embodiment of the present invention will be described hereinafter.

The constitutional elements of the third embodiment shown in FIG. 8 the same as those of the above mentioned embodiments of the optical modulator will not be described but bear the same reference numerals and legends as those of the above mentioned embodiments of the optical modulator.

FIG. 8 is an enlarged view showing the optical modulator according to the third embodiment of this invention. In this third embodiment, the optical modulator is characterized by the fact that most part of the bottom surface 32 between the ridge portions 8a, 8b is formed by an inclined flat surface. The bottom surface 32 between the ridge portions 8a and 8b has a center point 23 positioned with the distance of $W_R/2$ in a horizontal direction from the end point 18 of the top part 10a of the ridge portion 8a below the center electrode 4a. The bottom surface 32 further has a midway point 33 with the distance of $W_R/N$ (3≦N≦25) in a horizontal direction from the end point 18. The center point 23 and the midway point 33 define a line 35 passing therethrough. Also in this embodiment, the line 35 passing through the center point 23 and the midway point 33 is crossed with the normal line 13 of the top part 10a of the ridge portion 8a at an angle θ larger than 90.1°, in a similar manner with other embodiments of this invention. The side surface 30 of the ridge portion 8a and the line 35 define an intersection 34, where the line 35 passes through the center point 23 and the midway point 33. It goes without saying that the bottom surface 32 may have a portion, for example near the center point 23, with curvature. This constitution can be applied to any embodiments of this invention in which the optical modulator has a bottom surface with flat shape.

Fourth Embodiment

Figure 9:
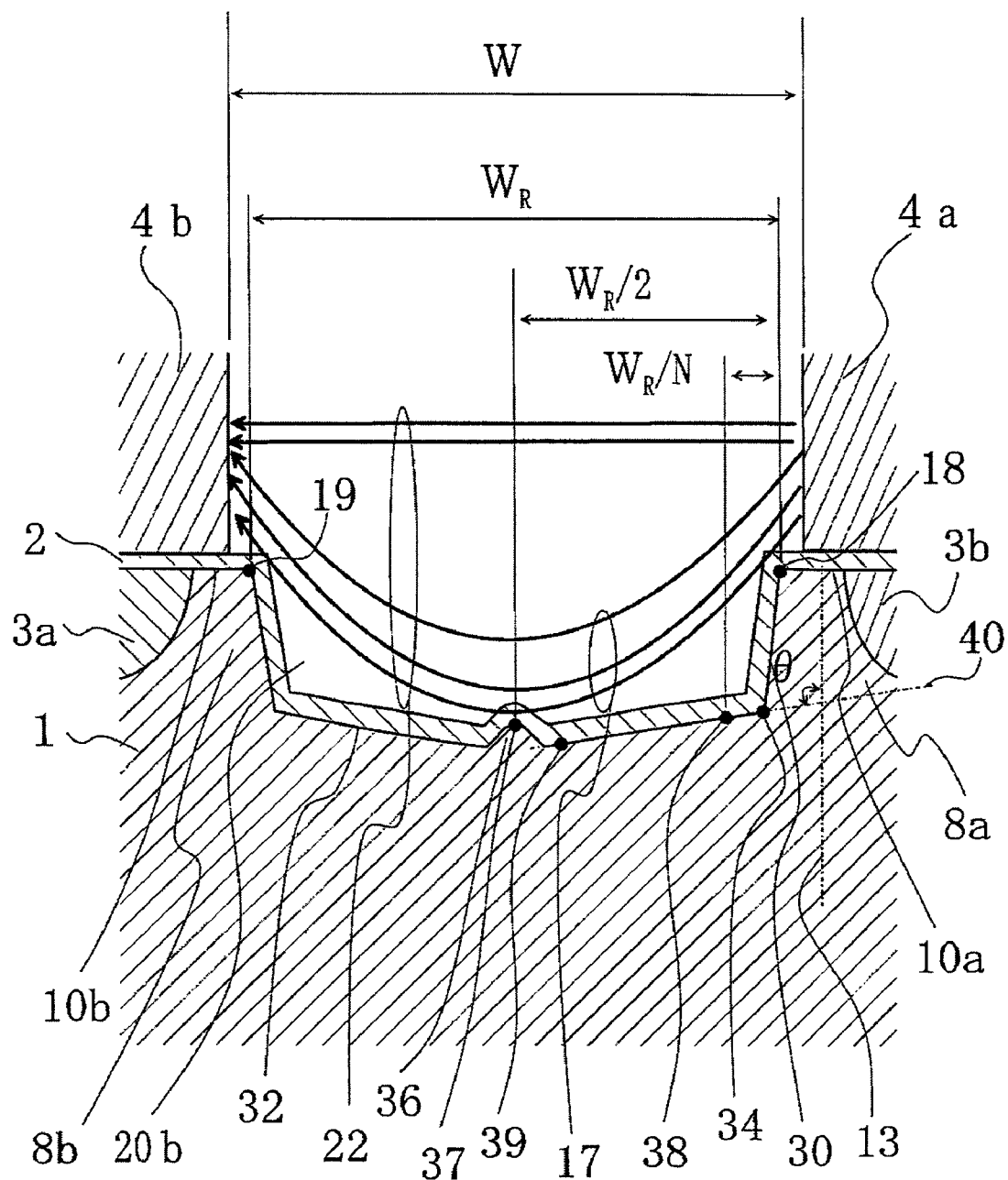
FIG. 9 is an enlarged view of the gap portion according to the fourth embodiment of the present invention.

Referring now to FIG. 9 of the accompanying drawings, an optical modulator according to the fourth embodiment of the present invention will be described hereinafter.

The constitutional elements of the fourth embodiment shown in FIG. 9 the same as those of the above mentioned embodiments of the optical modulator will not be described but bear the same reference numerals and legends as those of the above mentioned embodiments of the optical modulator.

FIG. 9 is an enlarged view showing the optical modulator according to the fourth embodiment of this invention. In the fourth embodiment, the z-cut LN substrate 1 has a bump 36 near the center point 37 of the bottom surface 32 between the ridge portions 8a and 8b, where the bump 36 is formed due to the manufacturing process of the optical modulator. This leads to the fact that the center point 37, positioned with the distance of $W_R/2$ in a horizontal direction from the end point 18 of the top part 10a of the ridge portion 8a below the center electrode 4a, is higher than the center point of the bottom surface according to the above mentioned embodiments. In this embodiment, the bottom surface 32 is formed such that the line 40 is crossed with the normal line 13 of the top part 10a of the ridge portion 8a at an angle θ larger than 90.1°, where the line 40 passes through the midway point 38 and a point 39, the point 39 is positioned between the midway point 38 and the center point 37, and the midway point 38 is positioned with the distance of $W_R/N$ ($3 \leq N \leq 25$) in a horizontal direction from the end point 18. There is an intersection 34 defined by the ridge portion 8a and the bottom surface 32 between the ridge portions 8a, 8b (i.e. the intersection 34 is defined by the side surface 30 of the ridge portion 8a and the line 40).

Each Embodiment

Though there has been described about the fact that the Mach-Zehnder optical waveguide exemplifies the branch-type optical waveguide, it goes without saying that the principle of this invention can be applied to any optical waveguides having a bifurcation portion and a mix portion exemplified by an optical directional coupler. In addition, the principle of this invention can be applied to the optical waveguide constituted by more than two interaction optical waveguides, and can also be applied to the phase modulator having one optical waveguide. The optical waveguide may be formed with any methods exemplified by a proton exchange method instead of the method of titanium thermal diffusion. In a similar manner, the buffer layer may be made of any materials instead of the $SiO_2$.

Figure 10:
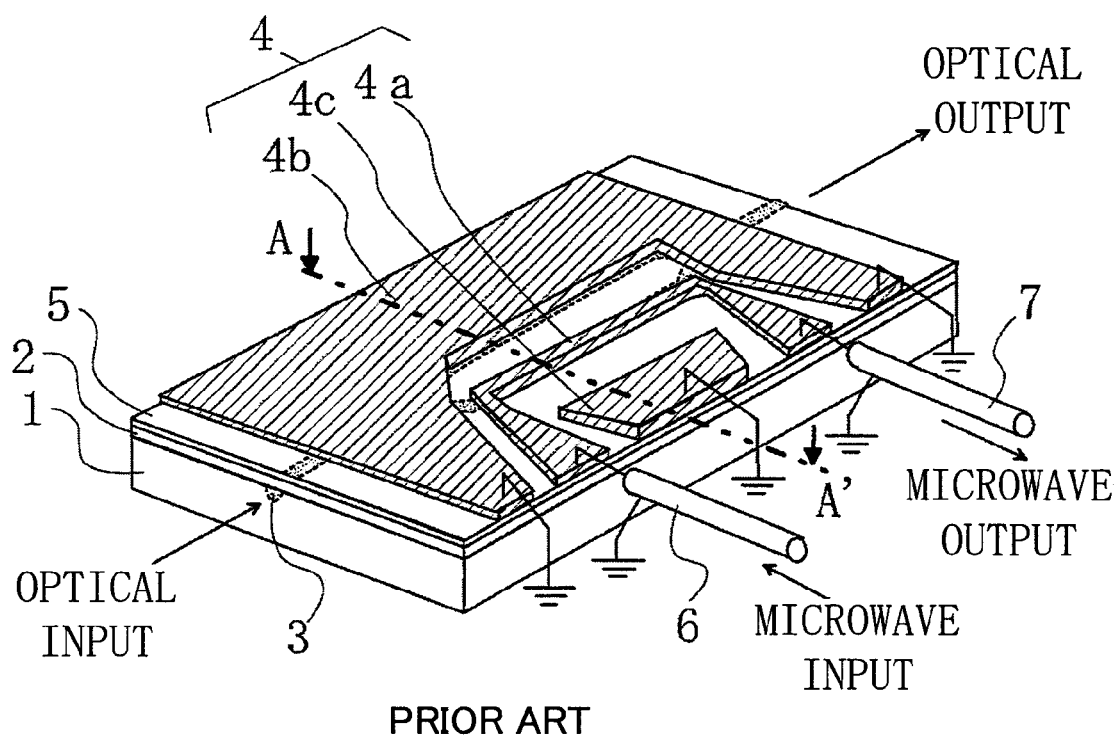
FIG. 10 is a perspective view showing the optical modulator according to the first prior art.
Figure 11:
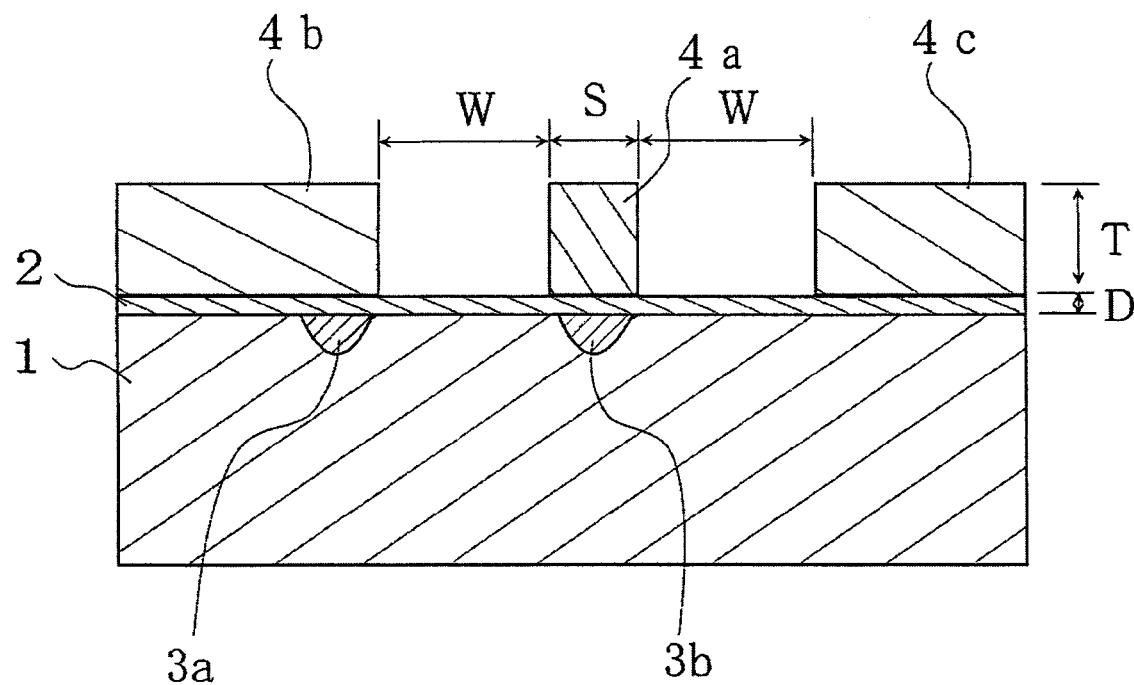
FIG. 11 is a sectional view taken along the line A-A' of FIG. 10 showing the optical modulator.

Though there has been described about the fact that the LN substrate has a z-cut state, the LN substrate may have another cut state. The LN substrate may be replaced by other substrate such as a lithium tantalite substrate and a semiconductor substrate. Though there has not been described to avoid the tedious explanation, the optical modulator may have a conducting layer, such as the Si conducting layer 5 in FIG. 10, to suppress the temperature drift.

Though there has been described about the fact that the LN substrate has three ridge portions, the LN substrate may have one or two ridge portions, or other number of ridge portions. In the embodiments of this invention, the word "ridge portion" is used in a broad sense. Therefore, the z-cut LN substrate may be dug only between the center electrode and the ground electrodes, and not dug at any other portions including the portions below the ground electrodes 4b, 4c.

Though there has been described about the fact that the electrode is constituted by the CPW having a symmetric structure, the electrode may be formed by a CPW having an asymmetric structure, an asymmetric coplanar strip (ACPS), symmetric coplanar strip (CPS) or the like. Part of the center electrode and the ground electrode forming the traveling wave electrode may directly contact with the LN substrate.

Though there has been described about the fact that the width of the center electrode 4a is substantially equal or narrower than the width of the top part of the ridge portion 8a, the width of the center electrode 4a may be wider than the top part of the ridge portion 8a. The ridge portions may have height different from each other.

In general, the interaction optical waveguide 3b below the center electrode 4a is positioned so that the interaction optical waveguide 3b is positioned right below the center electrode 4a. That is, the center axis, extending in a propagation direction, of the interaction optical waveguide 3b is parallel in a vertical plane to the center axis, extending in a propagation direction, of the center electrode 4a, to ensure that the optical modulation efficiency becomes highest. However, the interaction optical waveguide 3b may be positioned below the side edge of the center electrode 4a under the condition that the center electrode 4a has a large width.

In addition, it goes without saying that the output portion for outputting the electric signal may be terminated with a terminator having impedance such as 40Ω and 50Ω. Though there has been assumed that the characteristic impedance of the external circuit is 50Ω, it is within the scope of this invention that the external circuit or the optical modulator may have characteristic impedance not close to 50Ω as long as the microwave equivalent refractive index $n_m$ can be reduced or the characteristic impedance can be heightened by introducing the above mentioned construction.

In accordance with the present invention, there is provided an optical modulator which can have a wide optical modulation bandwidth due to the fact that the microwave equivalent refractive index $n_m$ can effectively be shifted closer to the effective refractive index $n_0$ of the interaction optical waveguides while improving the value of characteristic impedance and process yield, by forming the bottom surface between the ridge portions to be inclined to have curvature of downward convex toward the substrate.

What is claimed is:
1. An optical modulator, comprising:
    a substrate having an electro-optic effect;
    a buffer layer formed over said substrate; and
    a traveling wave electrode including a center electrode and a ground electrode formed above at least a part of said buffer layer, in which
    said substrate has a plurality of ridge portions including a first ridge portion and a second ridge portion, said ridge portions being formed with a process of forming gap portions by digging said substrate at regions where an electric field generated by a high frequency electric signal traveling through said traveling wave electrode is strong, at least one of said ridge portions has an optical waveguide formed therein, and said center electrode and said ground electrode are respectively formed above said first ridge portion and said second ridge portion, characterized in that said first ridge portion below said center electrode has a top part having a first end point, said second ridge portion below said ground electrode has a top part having a second end point, said first end point and said second end point are separated with each other with a distance of "$W_R$", said substrate has a bottom surface formed between said ridge portions, and said substrate has a cross section vertical to a longitudinal direction of said optical modulator and crossing said ridge portions, said cross section being formed such that, said bottom surface has a center point, a first midway point, and a second midway point, said center point being positioned with a distance of $W_R/2$ in a horizontal direction from said first end point, said second midway point being positioned with a distance of $W_R/N$ ($3 \leq N \leq 25$) in the horizontal direction from said first end point, said bottom surface further has a bump around said center point, said first midway point is positioned between said bump and said second midway point, said first ridge portion below said center electrode has a normal line to said top part, said first midway point and said second midway point define a straight line passing therethrough, and said straight line is crossed with said normal line at an angle larger or equal to 90.1°, to ensure that a microwave equivalent refractive index $n_m$ of said high frequency electric signal is reduced to be close to an effective refractive index $n_o$ of said optical waveguide.

2. An optical modulator as set forth in claim 1, in which said bottom surface is curved with a center of curvature positioned outside said substrate.

3. An optical modulator as set forth in claim 1, in which said bottom surface is partly formed to be a flat plane.

4. An optical modulator as set forth in claim 1, in which said second midway point is positioned with a distance of $W_R/8$ in the horizontal direction from said first end point.

5. An optical modulator as set forth in claim 1, in which said straight line is crossed with said normal line at an angle larger or equal to 90.5°.

6. An optical modulator as set forth in claim 1, in which said bottom surface and one of said ridge portions are connected by an intersection portion having a curvature.

7. An optical modulator as set forth in claim 6, in which said curvature of said intersection portion is formed by an arc having a curvature radius of "R", said curvature radius "R" being shorter or equal to 0.5 μm.

8. An optical modulator as set forth in claim 6, in which said curvature of said intersection portion is formed by an arc having a curvature radius of "R", and curvature radius "R" being longer or equal to 0.5 μm.

9. An optical modulator, comprising:
a substrate having an electro-optic effect;
a buffer layer formed over said substrate; and a traveling wave electrode including a center electrode and a ground electrode formed above at least a part of said buffer layer, in which said substrate has a plurality of ridge portions including a first ridge portion and a second ridge portion, said ridge portions being formed with a process of forming gap portions by digging said substrate at regions where an electric field generated by a high frequency electric signal traveling through said traveling wave electrode is strong, at least one of said ridge portions has an optical waveguide formed therein, and said center electrode and said ground electrode are respectively formed above said first ridge portion and said second ridge portion, characterized in that said first ridge portion below said center electrode has a top part having a first end point, said second ridge portion below said ground electrode has a top part having a second end point, said first end point and said second end point are separated from each other with a distance of "$W_R$", said substrate has a bottom surface formed between said ridge portions, and said substrate has a cross section vertical to a longitudinal direction of said optical modulator and crossing said ridge portions, said cross section being formed such that, said bottom surface has a center point and a midway point, said center point being positioned with a distance of $W_R/2$ in a horizontal direction from said first end point, said midway point being positioned with a distance of $W_R/N$ ($3 \leq N \leq 25$) in the horizontal direction from said first end point, said first ridge portion below said center electrode has a normal line to said top part, said center point and said midway point define a straight line passing therethrough, and said straight line is crossed with said normal line at an angle larger or equal to 90.1°, wherein said bottom surface is formed by a surface including two downwardly inclined segments that abut each other at said center point and form a corner-shaped area at said center point, to ensure that a microwave equivalent refractive index $n_m$ of said high frequency electric signal is reduced to be close to an effective refractive index $n_o$ of said optical waveguide.

10. An optical modulator, comprising:
a substrate having an electro-optic effect;
a buffer layer formed over said substrate; and
a traveling wave electrode including a center electrode and a ground electrode
formed above at least a part of said buffer layer, in which said substrate has a plurality of ridgeportions including a first ridge portion and a second ridge portion, said ridge portions being formed with a process of forming gap portions by digging said substrate at regions where an electric field generated by a high frequency electric signal traveling through said traveling wave electrode is strong, at least one of said ridge portions has an optical waveguide formed therein, and said center electrode and said ground electrode are respectively formed above said first ridge portion and said second ridge portion, characterized in that said first ridge portion below said center electrode has a top part having a first endpoint, said second ridge portion below said ground electrode has a top part having a second end point, said first end point and said second end point are separated from each other with a distance of "$W_R$", said substrate has a bottom surface formed between said ridge portions, and said substrate has a cross section vertical to a longitudinal direction of said optical modulator and crossing said ridge portions, said cross section being formed such that, said bottom surface has a center point and a midway point, said center point being positioned with a distance of $W_R/2$ in a horizontal direction from said first end point, said midway point being positioned with a distance of $W_R/N$ ($3 \leqq N \leqq 25$) in the horizontal direction from said first end point, said first ridge portion below said center electrode has a normal line to said top part, said center point and said midway point define a straight line passing therethrough, and said straight line is crossed with said normal line at an angle larger or equal to 90.1°, wherein said bottom surface is formed by at least one of a downward-facing convex surface having an intersection point at which a radius of curvature is shorter than a radius of curvature of electric lines of force passing through said gap portions and a surface including two downwardly inclined segments that abut each other at said center point and form a corner-shaped area at said center point, to ensure that a microwave equivalent refractive index $n_m$ of said high frequency electric signal is reduced to be close to an effective refractive index $n_o$ of said optical waveguide.

11. An optical modulator, comprising:

a substrate having an electro-optic effect;

a buffer layer formed over said substrate; and a traveling wave electrode including a center electrode and a ground electrode formed above at least a part of said buffer layer, in which said substrate has a plurality of ridge portions including a first ridge portion and a second ridge portion, said ridge portions being formed with a process of forming gap portions by digging said substrate at regions where an electric field generated by a high frequency electric signal traveling through said traveling wave electrode is strong, at least one of said ridge portions has an optical waveguide formed therein, and said center electrode and said ground electrode are respectively formed above said first ridge portion and said second ridge portion, characterized in that said first ridge portion below said center electrode has a top part having a first end point, said second ridge portion below said ground electrode has a top part having a second end point, said first end point and said second end point are separated from each other with a distance of "$W_R$", said substrate has a bottom surface formed between said ridge portions, and said substrate has a cross section vertical to a longitudinal direction of said optical modulator and crossing said ridge portions, said cross section being formed such that, said bottom surface has a center point and a midway point, said center point being positioned with a distance of $W_R/2$ in a horizontal direction from said first end point, said midway point being positioned with a distance of $W_R/N$ ($3 \leqq N \leqq 25$) in the horizontal direction from said first end point, said first ridge portion below said center electrode has a normal line to said top part, said center point and said midway point define a straight line passing therethrough, and said straight line is crossed with said normal line at an angle larger or equal to 90.1°, wherein said bottom surface is formed by at least one of a downward facing convex surface having an intersection point at which a radius of curvature is substantially 0 and a surface including two downwardly inclined segments that abut each other at said center point and form a corner-shaped area at said center point, to ensure that a microwave equivalent refractive index $n_m$ of said high frequency electric signal is reduced to be close to an effective refractive index $n_o$ of said optical waveguide.

12. An optical modulator as set forth in claim 9, in which said midway point is positioned with a distance of $W_R/8$ in the horizontal direction from said first end point.

13. An optical modulator as set forth in claim 9, in which said straight line is crossed with said normal line at an angle larger than or equal to 90.5°.

14. An optical modulator as set forth in claim 10, in which said bottom surface is curved with a center of curvature positioned outside said substrate.

15. An optical modulator as set forth in claim 10, in which said bottom surface is partly formed by a flat plane.

16. An optical modulator as set forth in claim 10, in which said midway point is positioned with a distance of WR/8 in the horizontal direction from said first end point.

17. An optical modulator as set forth in claim 10, in which said straight line is crossed with said normal line at an angle larger than or equal to 90.5°.

18. An optical modulator as set forth in claim 11, in which said bottom surface is curved with a center of curvature positioned outside said substrate.

19. An optical modulator as set forth in claim 11, in which said bottom surface is partly formed by a flat plane.

20. An optical modulator as set forth in claim 11, in which said midway point is positioned with a distance of WR/8 in the horizontal direction from said first end point.

21. An optical modulator as set forth in claim 11, in which said straight line is crossed with said normal line at an angle larger than or equal to 90.5°.

* * * * *